United States Patent [19]
Gallagher

[11] 3,972,317
[45] Aug. 3, 1976

[54] SOLAR FLUID HEATER

[75] Inventor: Robert George Gallagher, El Cajon, Calif.

[73] Assignee: Energy Systems, Inc., El Cajon, Calif.

[22] Filed: May 12, 1975

[21] Appl. No.: 576,853

[52] U.S. Cl. .............................. 126/271; 165/171; 237/1 A
[51] Int. Cl.² ............................................ F24J 3/02
[58] Field of Search ............ 126/270, 271; 237/1 A; 165/171 X; 248/68 R, 68 CB

[56] References Cited
UNITED STATES PATENTS

| | | | |
|---|---|---|---|
| 2,467,191 | 4/1949 | Crider | 165/171 |
| 2,688,794 | 9/1954 | Malutich | 165/171 |
| 3,464,402 | 9/1969 | Collura | 126/271 |

*Primary Examiner*—Kenneth W. Sprague
*Assistant Examiner*—James C. Yeung
*Attorney, Agent, or Firm*—Frank D. Gilliam

[57] ABSTRACT

A solar heater for heating a fluid passing through a plurality of side by side positioned solar panels. The solar panels are formed of heat conducting material with an upper solar energy exposed surface covered with a radiant heat absorbing material with high heat absorbing characteristics. A V shaped hinge groove is positioned along the upper longitudinal center line of the panel. The panel portions on each side of the hinge groove slope downward toward their outer edges. Curvi-linear channels are formed below the outer edges. The curvi-linear channels are received by bottom surface supported conduits that have common headers at respective ends extending beyond the solar panels. One header delivers ambient fluid to the conduits and the other removes heated fluid. The panels, conduit and headers are confined within a sealed insulated housing having integral, rigid side walls and bottom and at least one transparent panel spaced above the solar panels and sealed to the atmosphere. Fasteners partially passing through the hinge groove and secured to the support members hinge downward at the groove biasing the curvi-linear channels against the conduits.

10 Claims, 4 Drawing Figures

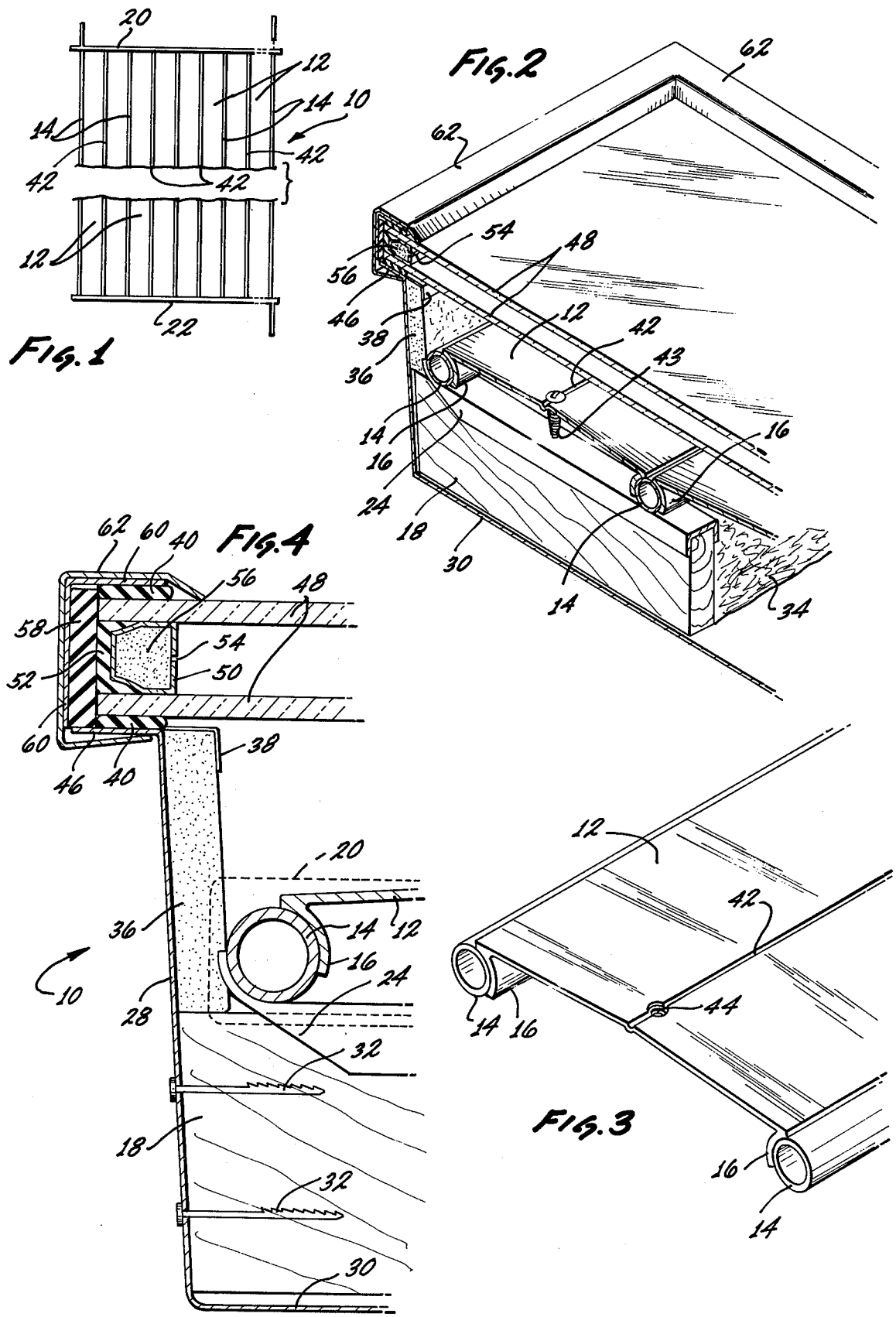

SOLAR FLUID HEATER

BACKGROUND OF THE INVENTION

The present invention relates to a solar energy heater and more specifically to a solar heater for heating a fluid.

A considerable number of solar fluid heating devices presently exist. The existing devices are found to have various deficiencies preventing optimum conversion of solar energy to a useful level of heat energy.

W. J. Bailey in U.S. Pat. No. 966,070 teaches the construction of solar panels by attaching the fluid carrying conduit along substantially a single line of physical contact by means of soldering or the like. This single and narrow contact limits the heat transfer between the solar panel surface and the conduit. Further teachings provide forming the solar panels upward from the lower center line of the conduit. This "cuping" of the conduit within the solar panel limits the maximum solar exposure of the panel to a nearly direct perpendicular sun to panel positional relationship, thus, when the sun is off the perpendicular, the conduit will shield the panel from direct solar exposure.

The T. B. Modine U.S. Pat. No. 2,274,492 teaches connecting a flat panel to the conduit along a single narrow surface contact area leaving substantially all of the conduit free from solar panel contact and thus failing to heat its entire outer surface.

The S. Andrassy U.S. Pat. No. 3,039,453 teaches use of a plastic conduit enclosed in a channel in a flat metal panel. The patent fails to teach the necessity of a tight physical contact between the channels of the panel and the conduit or any means for maintaining a sufficient degree of pressure between the panel and the conduit.

These and various other problems were not satisfactorily resolved until the emergence of the instant invention.

SUMMARY OF THE INVENTION

The instant invention has panels that attach to their associated conduit by means of a concave clip formed at each longitudinal surface. This attachment provides contact by the adjacent panels to a large portion of the outer surface of the conduits providing an efficient transfer of the collected energy from the panel to the conduit.

The panels are simple to construct in that a minimum of time is used to assemble the plurality of side by side panels and the housing structure.

The completed assembly is easy to repair if the need should arise in that the upper translucent panel is easily removed and each panel can be separately removed as needed.

The reduction of labor hours as a result of the snap fit feature of the assembly results in an economic savings over similar heat collecting panels that are less efficient.

The novel features which are considered as characteristic of the invention are set forth with particularity in the appended claims. The invention itself, however, as to its construction and obvious advantages will be best understood from the following description of the specific embodiments when read with the accompanying drawings.

BRIEF DESCRIPTION OF THE DRAWINGS

FIG. 1 is a plan view of the basic elements of the solar heater.

FIG. 2 is a partial perspective detailed view of the solar liquid heater.

FIG. 3 is a partial perspective view of a single panel from the solar liquid heater of FIGS. 1 and 2.

FIG. 4 is a partial end view of the solar liquid heater of FIG. 2.

DETAILED DESCRIPTION OF THE PREFERRED EMBODIMENTS OF THE INVENTION

The same reference numerals are used throughout the drawings and specifications to denote a similar item of the invention.

FIG. 1 shows a plan view of the basic elements making up the solar liquid heater of the invention. The various other figures show the elements of FIG. 1 in more specific detail. The solar fluid heater 10 is shown constructed of a plurality of side by side heat collecting panels 12.

Referring now to FIGS. 2, 4 and 5, each panel is confined between two conduits 14 at its outer curvi-linear conforming edge 16. The conduits are shown supported by support member 18, four being used for a typical 4-foot by 8-foot assembly. Headers 20, 22 for delivering ambient fluid to be heated and carrying away the heated liquid from the heater respectively are soldered, brazed or otherwise suitably connected to common ends of the conduit 14 to form a leak proof construction and thereby increase the efficiency of the heater. A bracket 24, one end shown, confines the two outermost conduits 14 in a fixed spaced relationship.

The basic solar heater 10 is confined within a container 26 for the purpose of confining the heat collected from the sun and prevent cooling by the surrounding atmosphere. The side walls 28 and the integral bottom portion 30 are generally constructed from a single piece of sheet metal, tin or aluminum, but may be constructed of separate pieces of similar material or wood to successfully practice the invention.

Support members 18 rest upon the bottom 30 of the container and are connected to the side walls 28 by any convenient means. Nails 32 passing through the side walls and securing into support member 18 are shown as typical. Any other similar means as well as glue may be used to satisfactorily practice the invention.

As can be seen in FIGS. 2 and 4, a plurality of panels 12 are positioned in a side by side noncontacting relationship to make up a solar fluid heater of the invention. These panels are spring biased between two adjacent conduits 14 with the curvi-linear portion 16 pressed into physical contact with the conduit. The panels are bowed upward along the V hinge 42, placed between the conduits and released allowing the elasticity of the panel material to return to its pre-bowed configuration wherein force is applied at the conduit contact areas. The panels can be formed of aluminum or like material having such characteristics. When additional pressure between the panel edges and conduit is required, an aperature 44 is provided selectively along the V hinge 42. A securing means such as a screw 43 with its body portion passing through aperature 44 and secured into the support member 18 pulls the panel downward at its center transmitting force to the edges 16. The V hinge permits the panels portions on each side of the hinge to move downward at their hinge connection without bowing their recti-linear surfaces. The securing means 43 additionally functions to hold the conduits positioned between the end conduits downward against bracket 24 and support member 18.

The space between the support members 18 between the lower surface of the panels 12 and the bottom 30 of the container 26 is filled with a good insulation material 34 which may be glass wool, fibre glass, foam plastic, saw dust or the like.

Additional insulation material 36 is positioned between the outer confined conduits and the adjacent side walls 28. Standard duct liner insulations enclosed in a smooth container is preferred but any suitable insulation material easily held in position may be used. As shown in FIG. 4, insulation 36 is biased toward the wall 28 at its lower portion by bracket 24 and at its upper portion by a metal clip 38 held in place by sealing tape 40 hereinafter described.

The side walls 28 include a lip 46 extending outwardly around the periphery of the container for supporting at least one transparent panel 40. Two panels are shown in the various figures as most generally two would be utilized. A single panel application may be used in areas having extremely high temperatures. When one panel is used, the bottom panel 48 nearest the upper surface of the panels 12 would be removed and a spacer 40 of increased height would be used between the lip 46 and the spacing member 50.

When both panels 48 are used, as shown, the spacer 50 is confined between the panels and a spacing member 52. The spacer 50 has an opening 54 in its inner wall and is filled with a moisture absorbent material 56. Any moisture trapped between the panels during assembly is absorbed thereby.

A second spacer 40 is positioned on the upper surface of the upper panel 48. The spacers 40 continue along the entire periphery of the panels. The spacers are made from soft non-hardening material such as sealing tape well known in the construction art. This tape is generally made from plastic and provides an air tight seal with the panels 48.

Spacers 52 are formed from thermo-setting material and spacers 58 formed from neopreme or any like non-outgassing material.

A metal angle bracket 60, generally made from sheet metal or the like forms a continuation of lip 46 and holds the various adjacent spacers in place. The angle bracket 60, like the spacers and the outer channel 62, hereinafter described, are continuous around the panels 48.

The outer channel 62 is formed from stainless steel or like material having similar characteristics. The channel is formed having a space between its open ends smaller than the space between the lip 46 and the angle bracket 60. This feature provides a positive bias between the lip and the angle bracket when installed thereby sealing the various components together within the inner portion of the solar fluid heater from the atmosphere.

In the preferred embodiment, the upper or solar energy exposed surface of the panel is coated with a radiant energy absorbant coating black in color and is either brushed, spray painted or electro-plated on the panel surface.

The operation of the solar fluid heater described is basic and should be easily understood as to operation. A simple explanation is hereinafter provided.

The apparatus comprises a sealed container having a transparent top and an intermediately positioned second transparent panel with an air space therebetween through which radiant energy from the sun's rays will penetrate. Positioned in this sealed container are a pair of header pipes connected to a plurality of conduits between a plurality of solar panels. The headers are provided with exterior connections allowing the fluid to enter and leave at the same side or on opposite sides of the heater. The sun's rays strike the panels, the heat being absorbed in the latter and transferred to the fluid within the conduits by conduction. As ambient fluid is passed through the conduits, it is warmed by the heat transfer and exits the conduits at an elevated temperature.

The invention may be embodied in other specific forms without departing from the spirit or essential characteristics thereof. The present embodiments are, therefore, to be considered in all respects as illustrative and not restrictive. The scope of the invention being indicated by the appended claims rather than by the foregoing description and all changes which come within the meaning and range of equivalency of the claims are therefore, intended to be embraced therein.

What is claimed to be new and useful and desired to be secured by United States Letters Patent is:

1. A solar heat collector panel for placement between a pair of fixed positioned juxtaposed fluid carrying conduits for solar energy transfer therebetween, said conduits carried by support members, said panel comprising:
   a hinge member positioned along the upper longitudinal center line thereof;
   a pair of panel members, one of said panel members positioned on each side of said hinge member and forming an integral structure therewith, said panel members sloping downward from the hinge member to their outer edges;
   curvi-linear channel portions formed at said outer edges of said panel members for mating with said conduits; and
   a biasing means for forcing the center of said hinge member toward said support member thereby hinging the portion of said panel members adjacent said hinge member downward biasing said curvi-linear channel portion against said conduits.

2. The invention as defined in claim 1, wherein said hinge member is a longitudinal groove between said panel members.

3. The invention as defined in claim 2, wherein said groove is V shaped.

4. The invention as defined in claim 1, wherein said curvi-linear channel portions have a diameter substantially equal to said conduits.

5. The invention as defined in claim 1, wherein said biasing means comprises aperatures through said panel and hinge members and symmetrical therewith and pressure applying means passing partially through said aperatures and secured to said support members.

6. A solar energy fluid heater comprising:
   an open housing having a bottom and sides;
   a plurality of side by side spaced apart solar panels for collecting solar energy, said solar panels each having an upper surface positioned below the opening in said housing for collecting solar heat energy, a hinge member positioned along the upper longitudinal center line thereof, a pair of panel members, one of said panel members positioned on each side of said hinge member and forming an integral structure therewith, said panel members sloping downward from the hinge members to their outer edges and curvi-linear channel portions formed at the outer edges thereof;

conduit members fixedly positioned in a juxtaposed relationship for receiving said curvi-linear channel portions of said panel members, said conduit members have a length sufficiently long to extend an equal distance beyond the ends of said solar panel;

header members one connecting each adjacent end of said conduit members with a portion thereof extending exterior of said housing;

a plurality of support members positioned along the bottom of said housing for supporting said conduit above said bottom thereby providing a space therebetween and fixedly positioning the conduits adjacent said sides;

insulating means positioned within said space and between said solar panels and said sides;

at least one panel of translucent material spaced above said upper surface said solar panel having a sealed relationship with said sides and forming a closure for the opening of said housing; and biasing means for forcing the center of each hinge member toward said support members thereby hinging the portion of said panel members adjacent said hinge member downward thereby biasing said curvi-linear channel portions against said conduits.

7. The invention as defined in claim 6, wherein said hinge member is a longitudinal groove between said panel members.

8. The invention as defined in claim 7, wherein said longitudinal groove is V shaped.

9. The invention as defined in claim 6, wherein said curvi-linear channel portions have a diameter substantially equal to said conduits.

10. The invention as defined in claim 6, wherein said biasing means comprise aperatures through said panel and hinge members and symmetrical therewith and pressure applying means passing partially through said aperature and secured to said support members.

* * * * *